United States Patent [19]

Noll et al.

[11] 3,965,020
[45] June 22, 1976

[54] SILICEOUS THERMAL INSULATION AND METHOD OF MAKING SAME

[75] Inventors: Charles H. Noll, Athens, Ga.; James B. Andrews, Zion, Ill.

[73] Assignee: Johns-Manville Corporation, Denver, Colo.

[22] Filed: Sept. 20, 1973

[21] Appl. No.: 399,229

[52] U.S. Cl. .................................. 252/62; 106/120; 106/309; 264/86; 264/333; 428/331; 428/372; 428/392; 428/446

[51] Int. Cl.$^2$ .................. C04B 43/02; C04B 43/06; C04B 43/12

[58] Field of Search ............. 252/62; 161/158, 162, 161/168–170, 206; 264/333, 86; 162/146; 106/119, 120, 98, 99, 291, 309; 428/323, 454, 331, 446, 372, 388, 392

[56] References Cited
UNITED STATES PATENTS

| | | | |
|---|---|---|---|
| 1,590,132 | 6/1926 | Teitsworth | 106/120 |
| 2,432,981 | 12/1947 | Abrahams et al. | 106/120 X |
| 2,523,085 | 8/1970 | Shannon | 252/62 |
| 2,586,726 | 2/1952 | Schuetz et al. | 162/153 |
| 2,633,433 | 3/1953 | Hollenberg | 252/62 X |
| 2,904,444 | 9/1959 | Hoopes et al. | 106/78 |
| 3,157,566 | 11/1964 | Brafford | 162/146 |
| 3,344,016 | 9/1967 | Moggio et al. | 162/146 |
| 3,367,871 | 2/1968 | Mueller et al. | 252/62 |
| 3,394,047 | 7/1968 | Sommer et al. | 162/146 |
| 3,419,495 | 12/1968 | Weldes et al. | 252/62 |
| 3,901,991 | 8/1975 | Ueda et al. | 428/446 |
| 3,902,913 | 9/1975 | Helser et al. | 106/119 X |

*Primary Examiner*—Harold Ansher
*Attorney, Agent, or Firm*—Robert M. Krone; Joseph J. Kelly; James W. McClain

[57] ABSTRACT

A method is disclosed for the formation of a siliceous thermal insulation, usable to 2000° F., from calcined and natural diatomite powders, hydrated lime, clay and synthetic fibers. The shaped insulating product obtained is also disclosed.

16 Claims, No Drawings

SILICEOUS THERMAL INSULATION AND METHOD OF MAKING SAME

BACKGROUND OF THE INVENTION

The invention herein relates to thermal insulation. More particularly it relates to siliceous thermal insulation, especially that which is useful at hot face temperatures of approximately 2000° F.

Siliceous thermal insulations have been used widely in industry for many years. Since many of these insulations have been designed for use under relatively moderate thermal environments, only a limited number have therefore been found satisfactory for use where advancing technologies have permitted industrial processes and equipment to operate at temperatures on the order of 2000° F. Typical of applications in which such temperatures are encountered are hot blast stoves, industrial and metallurgical furnaces and ovens and soaking pits. Consequently, there is a definite need in the industry for thermal insulation which can be provided in preshaped form and which can serve to thermally insulate industrial equipment with a hot face temperature on the order of 2000° F.

Additionally, in recent years some industrial users of thermal insulation have stated preferences for siliceous insulation which contain no asbestos fiber. It is therefore desirable to have a siliceous thermal insulation article which is reinforced by means other than asbestos fiber and which will operate satisfactorily at 2000° F.

OBJECTS OF THE INVENTION

It is therefore an object of this invention to provide a siliceous thermal insulation material which can be used satisfactorily in environments in which the hot face temperature of the object to be insulated is on the order of 2000° F.

It is also an object of this invention to provide a siliceous thermal insulation capable of operating in such an environment and containing no asbestos fiber.

It is further an object of this invention to provide an expeditious and economical method of producing such a thermal insulation.

BRIEF SUMMARY OF THE INVENTION

The invention herein is a method of forming a shaped siliceous thermal insulation which comprises mixing in an aqueous medium at a temperature in the range of 170° to 210° F. components comprising 8–14 weight percent clay, 60–85 weight percent diatomite powder, 5–10 weight percent hydrated lime and 1–8 percent synthetic fiber; allowing the mixed components to stand for a period of 0.5 to 2.0 hours; molding the desired shape; and thereafter drying the shaped siliceous thermal insulation.

The invention herein also comprises a shaped article of siliceous thermal insulation produced in the manner above. Preferred articles have the shape of blocks or axial halves of hollow right circular cylinders.

DETAILED DESCRIPTION AND PREFERRED EMBODIMENTS

The invention herein which yields the insulating product meeting the desirable objectives stated above resides in the combination of the use of certain materials and their method of preparation. The principal component used in the present invention is siliceous diatomite. The diatomite will comprise entirely or in large part calcined diatomite. A minor portion of the diatomite may comprise natural (uncalcined) material, but since a higher quality product is obtained when more of the diatomite is calcined, all calcined material is preferred. The total amount of diatomite will be 60–85 weight percent of the composition, preferably 65–80 weight percent. Of this amount 80–100%, preferably 85–95%, will be calcined material and 0–20%, preferably 5–15% will be natural diatomite.

The major portion of the diatomite component of this invention is a calcined diatomite. This is a material composed of approximately 90% silica and having a moisture content after calcining of less than 0.5%. The material has a specific gravity of approximately 2.2 and is in the form of a powder having a particle size distribution such that a maximum of 10% is retained on a 150 mesh Tyler standard sieve. Surface area is on the order of about 5 $m^2/g$. Suitable materials are commercially available under the Trademark CELITE from the Johns-Manville Corporation.

The second type of diatomite which may be used in the present invention is a natural diatomite powder. This is a material having an average silica content of 80–87 weight percent and an average moisture content of about 2.5 to 4 percent. The specific gravity is approximately 2.0 and the powder has a particle size such that a maximum of 7% is retained on a 325 mesh Tyler standard sieve. Surface area is on the order of 20–30 $m^2/g$. Commercial diatomite of this description is also available under the Trademark CELITE from the Johns-Manville Corporation.

The second component of this invention is hydrated lime. Hydrated lime is a general article of commerce and many suitable sources are available. Specifications for the material will be found in ASTM Specification C-5. The hydrated lime will be present in the composition as from 5–10 weight percent, and preferably as from 6–8 weight percent.

Also present as a component of this invention is a 8–14 weight percent, preferably 10–13 weight percent of clay. The clay will preferably be of the montmorillonite type, and more preferably bentonite. As with the hydrated lime, satisfactory clays are widely available commercially.

Another component of the composition herein is a fibrous reinforcement. This consists of synthetic fibers, both organic and inorganic. These will normally be in the form of chopped fibers having lengths of from one-quarter to two inches, preferably one-quarter to one inch. Synthetic inorganic fibers, such as glass fiber or aluminum silicate fibers, will normally have diameters of from about 7 to 12 microns, preferably about 10 microns. Synthetic organic fibers, which may include polyesters, rayon, nylon and the like, will normally be of from 1 to 8 denier, preferably from 1.5 to 6 denier. Single types of fibers may be used for reinforcement herein or fibers of different types may be mixed. For example, preferred embodiments include those in which glass fibers and polyester fibers are used separately or a mixture of glass and polyester fibers is used. Particularly preferred is an embodiment in which the glass fiber and polyester fiber are present in the weight ratio of from 1:4 to 4:1, preferably 1:4 to 1:1. The fiber component will be present as from 1 to 8 weight percent of the composition, preferably as from 1 to 5 weight percent. It will be noted that natural inorganic fibers are excluded from the component mixture of this invention. Thus, fibrous materials which have heretofore been used in thermal insulation at elevated temperatures, such as amosite asbestos or chrysotile asbestos, are absent from the present composition.

The component mixture may also include small amounts, as from 0.5 to 4 weight percent, of natural organic fibers. These will ordinarily be cellulosic fibers such as wood fiber, kraft fiber and the like.

The asbestos-free insulating materials of this invention are produced by mixing the above described components in an aqueous medium at a temperature of from 170° to 210° F., preferably from 180° to 200° F. This mixing may be done in conventional industrial mixing equipment. The amount of water present will be such that the water:solids ratio will be in the range of from 6–12:1, preferably 8–10:1. Lower ratios, which lead to thicker slurries, have lower mixing efficiencies and require greater mixing time to thoroughly mix the components. Higher ratios on the other hand are unnecessary to obtain thorough mixing in reasonable time. In addition they are inefficient in that they contain excess water which must be heated and later drained during molding. Mixing can usually be accomplished in a period of a few minutes; commonly 5 to 30 minutes. Other mixing periods may be used, depending on the particular equipment available. The exact length of time of mixing is not critical, as long as a thorough mixture of the components is obtained.

Following mixing the aqueous slurry is allowed to stand, essentially quiescent, for a period of from one-half to two hours at a temperature of from 150° to 200° F. During this period reaction between the lime, silica and water occurs leading to the production of certain calcium silicate hydrate material. Since excess silica is present from the diatomite, the slurry after the setting period will also contain silica and reaction products of the clay component and silica. Because of the numerous types and compositions of reaction products which form under these conditions, no specific formulation of the final insulating product can be given. Those skilled in the art will be aware of the types of reactions which would be expected to occur, however, and will recognize that the final product will be a material with a high concentration of silica and siliceous reactants, including forms of hydrated calcium silicate.

Following the standing period, which is preferably on the order of about one hour, the aqueous slurry of silica and reaction products is transported to molding means where much of the water is removed and the material molded to the desired final configuration. Conventional molding techniques may be used, such as casting in porous molds from which the water can be drained or molding in filter presses. A variety of shapes of insulating material may be obtained by these processes. Most commonly the shapes will be flat rectangular blocks, slightly curved rectangular blocks designed to fit the outer surface of large cylindrical reaction vessels, and pipe insulation shapes, commonly those known as "half-rounds" which are the axial halves of hollow right circular cylinders with the inside diameter being determined by the particular pipe diameter to be insulated.

Following molding, the shaped insulating products are dried. Drying may be accomplished merely by exposing the molded products to the ambient air. However, the drying time required is greatly reduced by exposing the products to heated air in ovens. Drying ovens having air heated to the temperature of from 300° to 450° F., preferably 350° to 425° F., has been found to be very satisfactory. Drying times of the wet molded blocks will, of course, depend upon the thickness of block molded, but will commonly be in the range of from 5 to 40 hours, usually 8 to 20 hours. Overnight drying has been found to be quite satisfactory.

As another advantage of the present invention, it has been found that insulating shapes made by the process of this invention exhibit very little shrinkage upon drying, and subsequently in use. This is quite important, for proper fit of blocks and shapes in service is highly dependent upon dimensional consistency from product to product.

As an example of the processs and product of this invention, shaped insulation materials were formed in the following manner from components in the table below:

| Component | Wt. % | Wt., lbs. |
|---|---|---|
| Calcined Diatomite Powder | 67 | 900 |
| Natural Diatomite Powder | 11 | 150 |
| Hydrated Lime | 7 | 100 |
| Bentonite Clay | 11 | 150 |
| Synthetic Fiber | 2 | 20 |
| | | 10 lbs. glass fiber |
| | | 10 lbs. polyester fiber |
| Natural Organic Fiber | 2 | 25 |

These were mixed with 1400 gal. of water for nine minutes at about 190° F. The mixture was then pumped into a storage tank and allowed to stand for one hour during which time the temperature dropped from 190° to 150° F. Thereafter, the slurry at a temperature of about 150° F. was piped to filter molding presses and molded into blocks and half-rounds of various sizes. Filter press pressure and time of molding were regulated to produce blocks which following drying had a density in the range of from 18–26 lbs/ft$^3$. Drying of the smaller thickness molded pieces was for a period of about 8 to 16 hours (overnight) while the larger thickness pieces were generally dried for a period of up to 40 hours. The various shaped products were thereafter shown by laboratory testing and sealed use to be eminently suitable for insulation at a hot face temperature of 2000° F.

If desired, a small amount of scrap material from previous batches of the insulation of this invention may be added to the component mixture. Such scrap often is obtained when the dried shapes are cut or trimmed to fit particular objects to be insulated. The scrap material will usually not exceed 5 weight percent added material.

What is claimed is:

1. A method of forming a shaped predominately siliceous thermal insulation which consists essentially of
    a. mixing in an aqueous medium at a temperature in the range of 170°–210°F. components including no natural inorganic fiber and consisting essentially of
        60–85 wt. % diatomite powder
        5–10 wt. % hydrated lime
        8–14 wt. % clay and
        1–8 wt. % synthetic fibers;
    b. allowing the mixed components to stand for a period of 0.5–2.0 hours at a temperature in the range of 150°–200°F.;
    c. molding the desired shape, and d. drying said shaped siliceous thermal insulation.

2. The method of claim 1 wherein the diatomite powder component comprises a mixture of calcined and natural diatomite powders.

3. The method of claim 2 wherein said calcined diatomite powder comprises at least 80% of said mixture and said natural diatomite powder comprises up to 20% of said mixture.

4. The method of claim 3 wherein said mixture comprises 85–95% calcined diatomite and 5–15% natural diatomite.

5. The method of claim 1 wherein said diatomite component consists essentially of calcined diatomite.

6. The method of claim 1 wherein said mixing is in an aqueous medium wherein the water:solids ratio is in the range of 6–12:1.

7. The method of claim 6 wherein said water:solids ratio is in the range of 8–10:1.

8. The method of claim 1 wherein said components also include 0.5–4.0 wt. percent natural organic fibers.

9. The method of claim 1 wherein said molding is accomplished by filter pressing.

10. The method of claim 1 said drying is accomplished by exposing the molded shape to air at a temperature in the range of 300°–450° F.

11. The method of claim 1 wherein said components comprise approximately 67 wt. % calcined diatomite powder
11 wt. % natural diatomite powder
7 wt. % hydrated lime
11 wt. % bentonite clay
2 wt. % synthetic fiber and
2 wt. % natural organic fiber 12. A shaped article of siliceous thermal insulation made by the method of claim 11.

13. A predominately siliceous shaped article containing no natural inorganic fiber and consisting essentially of the product of the reaction of
60–85 wt. % diatomite powder
5–10 wt. % hydrated lime
8–14 wt. % clay and
1–8 wt. % synthetic fiber and produced by a process consisting essentially of mixing in an aqueous medium at a temperature in the range of 170°–210°F., being allowed to stand for a period of 0.5–2.0 hours at a temperature of 150°–200°F., and then being molded to shape and dried.

14. The article of claim 13 having the shape of a flat rectangular block.

15. The article of claim 13 having the shape of the axial half of a hollow right circular cylinder.

16. The article of claim 13 having the shape of a slightly curved rectangular block.

* * * * *